(12) United States Patent
Agnew (10) Patent No.: US 9,561,706 B2
(45) Date of Patent: *Feb. 7, 2017

(54) VEHICLE WINDOW ASSEMBLY (71) Applicant: Nissan North America, Inc., Franklin, TN (US)

(72) Inventor: David Agnew, Clarkston, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/671,861

(22) Filed: Mar. 27, 2015

(65) Prior Publication Data

US 2016/0280047 A1 Sep. 29, 2016

(51) Int. Cl.
| | |
|---|---|
| *B60J 1/00* | (2006.01) |
| *B60J 1/20* | (2006.01) |
| *B60J 5/06* | (2006.01) |
| *B60J 1/16* | (2006.01) |
| *E05D 5/02* | (2006.01) |
| *E05D 11/00* | (2006.01) |

(52) U.S. Cl.
CPC .............. *B60J 1/2094* (2013.01); *B60J 1/16* (2013.01); *B60J 5/06* (2013.01); *E05D 5/0207* (2013.01); *E05D 11/0054* (2013.01); *E05D 2011/0063* (2013.01)

(58) Field of Classification Search
CPC .............. B60J 1/2094; B60J 1/16; B60J 5/06; E05D 5/0207; E05D 11/0054

USPC .. 296/95.1, 146.15, 146.16; 280/748; 49/50, 56, 57; 16/90, 92, 235, 239, 250
See application file for complete search history.

(56) References Cited

U.S. PATENT DOCUMENTS

| | | | | | |
|---|---|---|---|---|---|
| 2,864,648 | A | * | 12/1958 | Bland | ........................ B60J 1/20 280/748 |
| 4,653,562 | A | * | 3/1987 | Moss | ........................ B60J 1/20 160/105 |
| 5,810,412 | A | * | 9/1998 | Hall | ........................ B60P 3/04 296/24.31 |
| 5,954,384 | A | * | 9/1999 | Jones | ..................... B60J 1/2011 280/748 |
| 2004/0040230 | A1 | * | 3/2004 | Taegar | ..................... E06B 9/04 52/202 |

* cited by examiner

*Primary Examiner* — Joseph D Pape
(74) *Attorney, Agent, or Firm* — Global IP Counselors, LLP (57) ABSTRACT

A vehicle window assembly includes a body structure, a hinge structure, and a covering panel. The hinge structure includes a hinge base and a hinge cover, the hinge base including an attachment portion attached to an upper portion of the body structure, a cover mounting portion, and a loop support portion extending from the attachment portion to the cover mounting portion, the hinge cover being attached to the cover mounting portion. The covering panel includes a hanging loop with a hanging section disposed between the loop support portion of the hinge base and the hinge cover, and is movable between a secured position in which the hanging section of the hanging loop is positioned adjacent the attachment portion of the hinge base, and an unsecured position in which the hanging section of the hanging loop is disposed adjacent the cover mounting portion of the hinge base.

20 Claims, 12 Drawing Sheets

VEHICLE WINDOW ASSEMBLY

BACKGROUND

Field of the Invention

The present invention generally relates to a vehicle window assembly. More specifically, the present invention relates to a vehicle window assembly that prevents objects from passing through a vehicle window opening.

Background Information

To restrict objects passing through windows in vehicles, side curtain airbags have been used. Additionally, some vehicles have included window glazing. Each of these methods has had some success in restricting objects passing through windows in vehicles.

SUMMARY

It has been discovered that in to improve the restriction of objects passing through windows, a covering panel of a vehicle window assembly can be disposed so as to overlie a window opening. In view of the state of the known technology, one aspect of the present invention includes a vehicle window assembly comprising a body structure, a hinge structure and a covering panel. The body structure defines a window opening, and has an upper portion extending along an upper edge of the window opening. The hinge structure comprises a hinge base and a hinge cover, the hinge base comprising an attachment portion attached to the upper portion of the body structure, a cover mounting portion, and a loop support portion extending from the attachment portion to the cover mounting portion, the hinge cover being attached to the cover mounting portion. The covering panel overlies an inboard side of the window opening, and comprises a hanging loop with a hanging section being disposed between the loop support portion of the hinge base and the hinge cover, and is movable between a secured position in which the hanging section of the hanging loop is positioned adjacent the attachment portion of the hinge base, and an unsecured position in which the hanging section of the hanging loop is disposed adjacent the cover mounting portion of the hinge base.

Another aspect of the present invention includes a hinge structure comprising a hinge base and a hinge cover. The hinge base comprises an attachment portion configured to be attached to vehicle structure, a cover mounting portion, and a loop support portion extending from the attachment portion to the cover mounting portion. The hinge cover is configured to be attached to the cover mounting portion, the hinge base and hinge cover being configured such that, when coupled together, a hanging section of a hanging loop is disposed between the loop support portion of the hinge base and the hinge cover, and is movable between a secured position in which the hanging section is positioned adjacent the attachment portion of the hinge base, and an unsecured position in which the hanging section of the hanging loop is disposed adjacent the cover mounting portion of the hinge base.

Another aspect of the present invention includes a vehicle window assembly comprising a body structure, a hinge structure and a covering panel. The body structure defines a window opening, and has an upper portion extending along an upper edge of the window opening and a plurality of mounting studs. The hinge structure comprises a hinge base and a hinge cover, the hinge base comprising an attachment portion attached to the upper portion of the body structure, a cover mounting portion, and a loop support portion extending from the attachment portion to the cover mounting portion, the hinge cover being attached to the cover mounting portion. The covering panel overlies an inboard side of the window opening, and comprises a plurality of attachment brackets and a hanging loop with a hanging section being disposed between the loop support portion of the hinge base and the hinge cover, and being movable between a secured position in which the hanging section of the hanging loop is positioned adjacent the attachment portion of the hinge base, the attachment brackets are installed on the mounting studs, and the covering panel extends parallel to a plane of the window opening, and an unsecured position in which the hanging section of the hanging loop is disposed adjacent the cover mounting portion of the hinge base and the attachment brackets are unattached to the mounting studs, enabling the covering panel to be moveable between a first position in which the covering extends at a first angle to the plane of the window opening, and a second position in which the covering extends at a second angle to the plane of the window opening, the second angle being larger than the first angle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
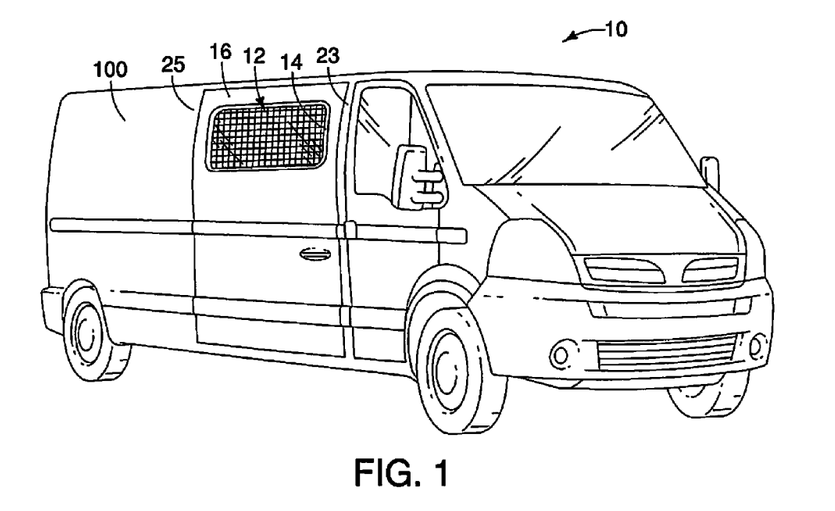
FIG. 1 is a perspective view of a vehicle with a vehicle window assembly according to one embodiment of the present invention.
Figure 2:
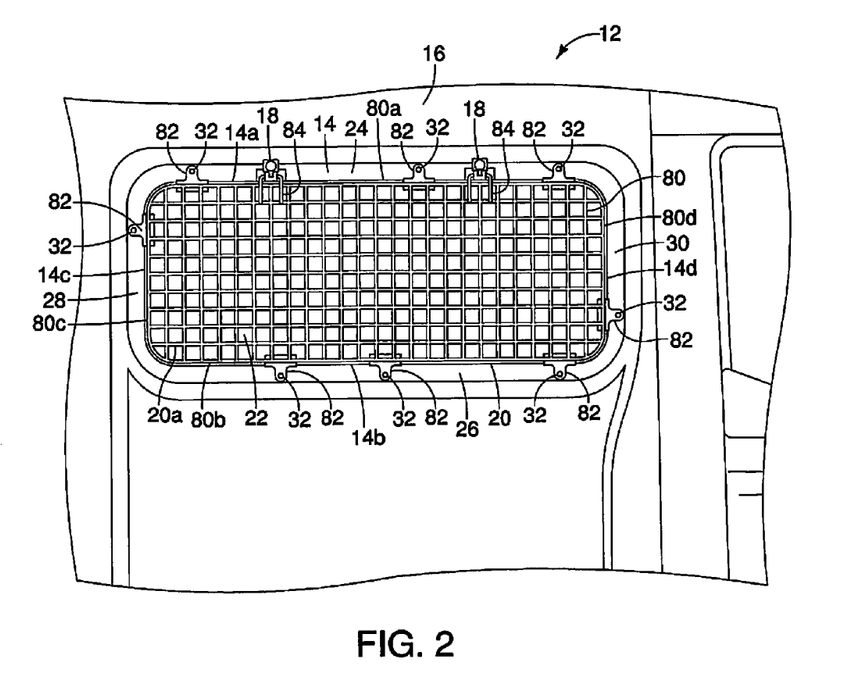
FIG. 2 illustrates a vehicle window assembly according to one embodiment with the covering panel attached to the body structure.
Figure 3:
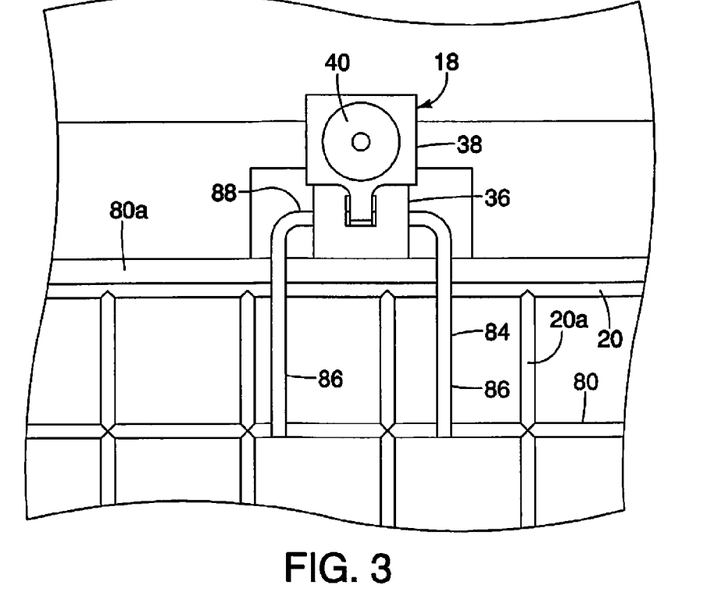
FIG. 3 illustrates an enlarged front view of a hinge structure in the vehicle window assembly shown in FIG. 2.
Figure 4:
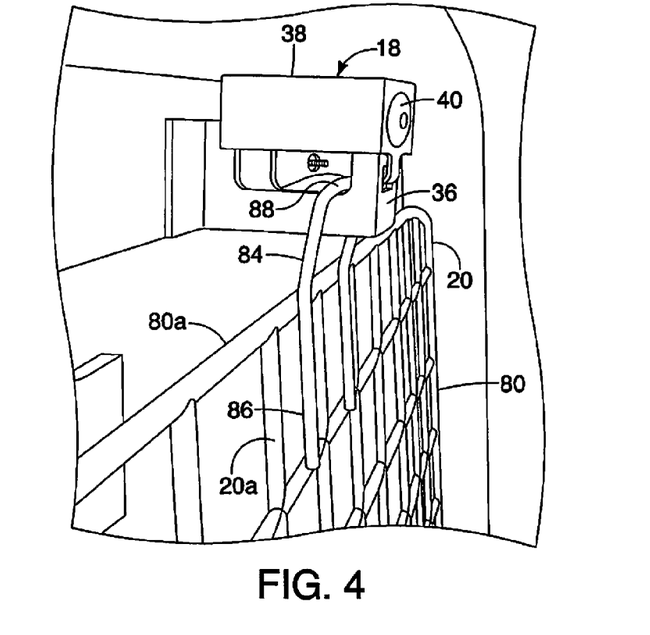
FIG. 4 illustrates a side perspective view of the hinge structure in the vehicle window assembly shown in FIG. 3, with the covering panel in an unsecured position.
Figure 5:
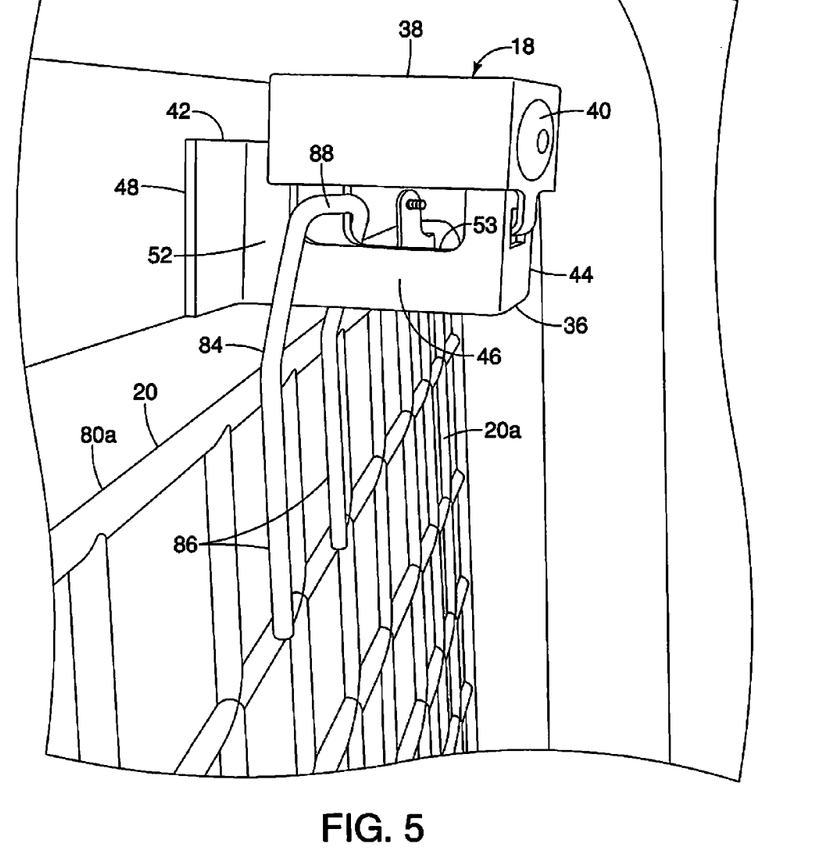
FIG. 5 illustrates a side perspective view of the hinge structure in the vehicle window assembly shown in FIG. 3, with the covering panel in the secured position.

Referring initially to FIGS. 1 and 2, a vehicle window assembly 12 is illustrated in accordance with a first embodiment. The vehicle window assembly 12 can be disposed so as to overlie the interior side of a window opening 14 in a door a vehicle 10 (e.g. a cargo van). The vehicle window assembly 12 comprising a body structure 16, at least one hinge structure 18 and a covering panel 20. The vehicle window assembly 12 restricts objects from passing through the vehicle window opening 14 to maintain objects within the vehicle 10. Moreover, based on the vehicle window assembly 12 structure, at least a portion of the covering panel 20 can be moved relative to the window opening 14 so as to enable a window 22 disposed in the window opening 14 to be cleaned.

Figure 10:
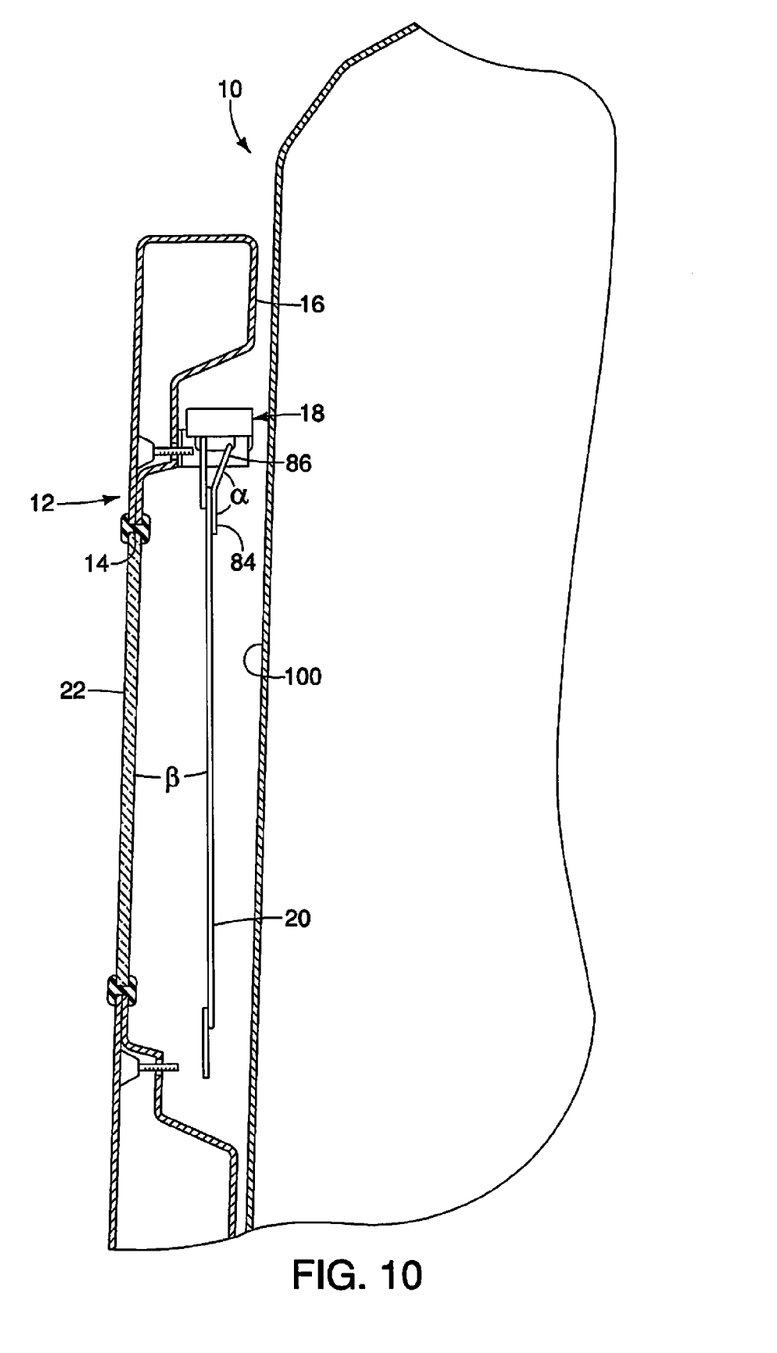
FIG. 10 is a side cross-sectional view of the body structure of FIG. 2, with the covering panel shown in an unsecured position and a vehicle sliding door in an open position.

The body structure 16 can be a vehicle door, such as a metal cargo van sliding door (FIG. 10). That is, in one embodiment, the body structure 16 is a sliding door movable from a closed position (FIG. 1) in which the sliding door is positioned between a forward pillar 23 and a rearward pillar 25, and an open position (FIG. 10) in which the sliding door is positioned outboard of the rearward pillar 25. Accordingly, the covering panel 20, when in the unsecured position, extends downward such that the covering panel 20 is positioned outboard of and free from contacting the rearward pillar 25 when the sliding door is moved to the open position however, the body structure 16 can be any suitable structure or material for a vehicle structure having a vehicle window opening 14. As shown in FIG. 2, the body structure 16 defines the window opening 14 that can have the window 22 disposed therein.

The body structure 16 has an upper portion 24 extending along an upper edge 14a of the window opening 14, a lower portion 26 extending along a lower edge 14b of the window opening 14, a first side portion 28 extending along a first side edge 14c of the window opening 14 and a second side portion 30 extending along a second side edge 14d of the window opening 14. In this embodiment, the upper portion 24 is generally parallel to the lower portion 26 and the first side portion 28 is generally parallel to the second side portion 30, so that the body structure 16 defines a rectangular window opening; however, the window opening 14 can be any suitable configuration.

Figure 8:
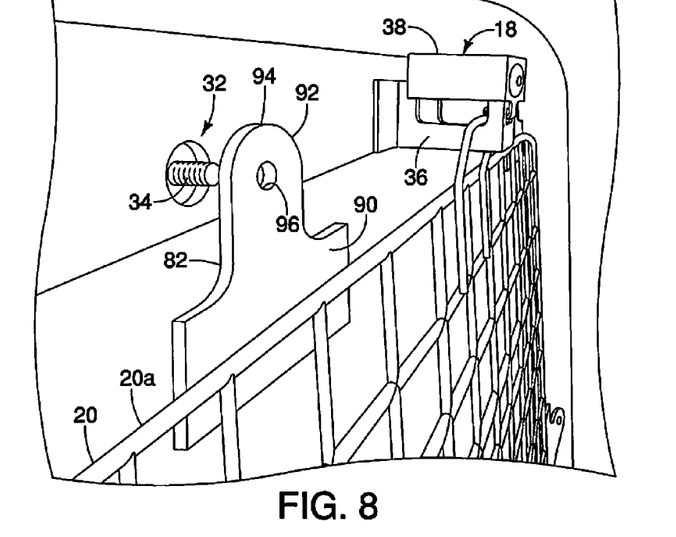
FIG. 8 is a side perspective view of the covering panel of the vehicle window assembly in an unsecured position.

As shown in FIGS. 2 and 8, the body structure 16 has a plurality of mounting studs 32 extending therefrom (e.g., eight (8) mounting studs as shown in FIG. 2). The mounting studs 32 preferably have a threaded shaft 34 extending from the body structure 16. In this embodiment, a mounting stud 32 is disposed along the first side portion 28. The mounting stud 32 disposed on the first side portion 28 is disposed so as to be near or adjacent the upper portion 24. A mounting stud 32 is disposed along the second side portion 30. A mounting stud 32 is disposed on the second side portion 30 near or adjacent the lower side portion. Three mounting studs 32 are disposed along the upper portion 24, with one mounting stud 32 disposed adjacent the first side portion 28, a mounting stud 32 disposed adjacent the second side portion 30 and a mounting stud 32 disposed between two mounting studs. Three mounting studs 32 are disposed along the lower portion 26, with a mounting stud 32 disposed adjacent the first side portion 28, a mounting stud 32 disposed adjacent the second side portion 30 and the mounting stud 32 disposed between two mounting studs 32. The position and number of mounting studs 32 illustrated herein is merely exemplary, and there can be any suitable number of mounting studs 32 disposed in any desired position.

As shown in FIG. 2, in one embodiment, the vehicle window assembly 12 includes two hinge structures 18. However, it is noted that the vehicle window assembly 12 can include any suitable number of hinge structures. Since each of the hinge structures 18 is substantially identical, only one hinge structure 18 will be described herein. As shown in FIGS. 3-6, the hinge structure 18 is a generally a U-shaped metal, unitary structure that includes a hinge base 36 and a hinge cover 38, which are coupled together with a fastener 40. The hinge base 36 includes an attachment portion 42, a cover mounting portion 44, and a loop support portion 46.

Figure 6:
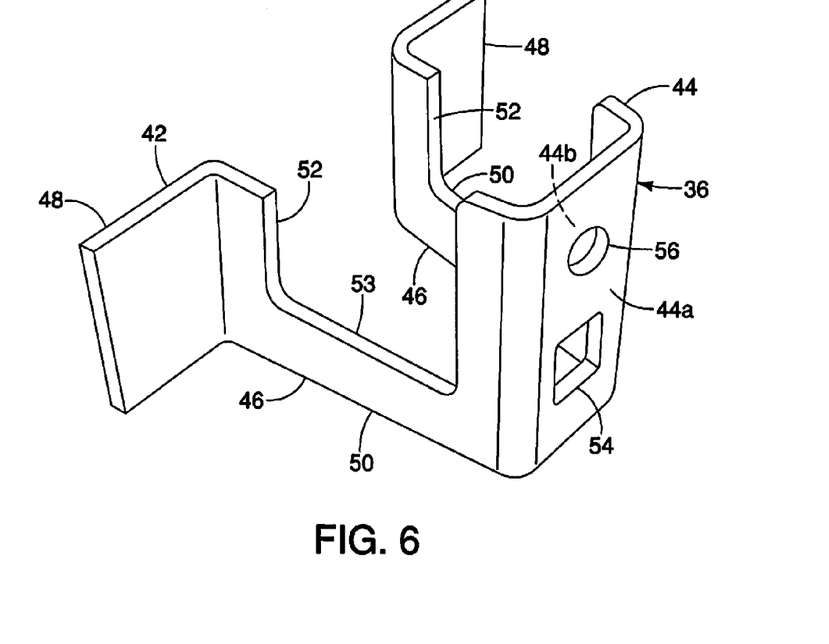
FIG. 6 is a top perspective view of the hinge base of the hinge structure shown in FIG. 3.

In one embodiment, the attachment portion 42 has two generally rectangular flanges 48 that are proximal to and rigidly attached to the upper portion 24 of the body structure 16. Accordingly, the two flanges 48 can extend away from each other in the same plane so as to facilitate rigid attachment to the body structure 16. However, the attachment portion 42 can be any suitable configuration, have any suitable number of flanges, and can be attached to the upper portion 24 of the body structure 16 in any suitable manner, such as welding or adhesive.

The loop support portion 46 generally includes two longitudinal sections 50 having opposed retention flanges 52 extending from the two flanges 48 of the attachment portion 42, respectively. The two longitudinal sections 50 are opposed to each other and can extend inboard from the flanges 48 in a generally perpendicular manner, or at any suitable angle. In this embodiment, the two longitudinal sections 50 extend from the flanges 48 at an angle of more than 90 degrees. Each of the two longitudinal sections 50 of the loop support portion 46 generally define a recessed portion 53. Thus, the recessed portion 53 of the loop support portion 46 has a height that is less than other portions of the hinge base 36.

The cover mounting portion 44 is attached to the loop support portion 46 such that the loop support portion 46 extends between the attachment portion 42 and the cover mounting portion 44. The cover mounting portion 44 extends generally upwardly and perpendicularly from the loop support portion 46. The cover mounting portion 44 includes a generally rectangular wall 44a and an outboard surface 44b that extend between the two longitudinal sections 50 of the loop support portion 46, and includes a tab aperture 54 and a fastener aperture 56. In this embodiment, the fastener aperture 56 and the tab aperture 54 are both disposed approximately along the center line of the cover mounting portion 44 with the fastener aperture 56 being disposed above the tab aperture 54. The tab aperture 54 is generally rectangular and the fastener aperture 56 is generally circular. However, each aperture can be any suitable shape or configuration.

Figure 7:
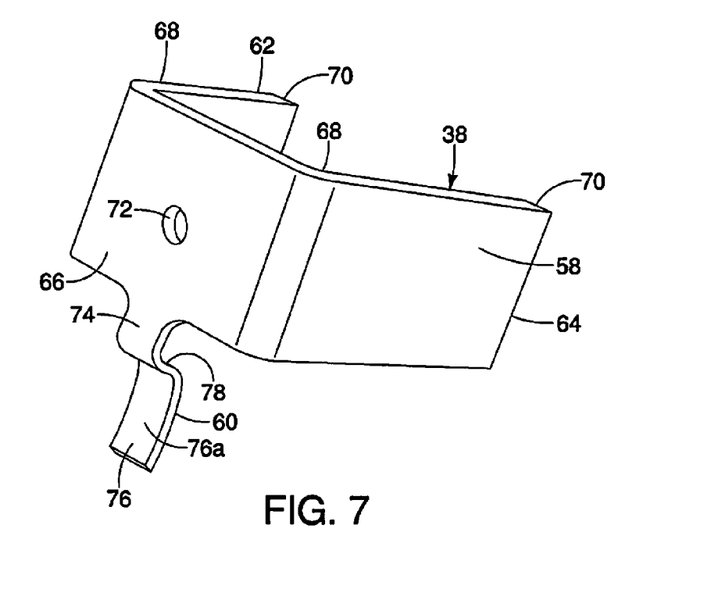
FIG. 7 is a front perspective view of a hinge cover of the hinge structure shown in FIG. 3.

As shown in FIGS. 3-5 and 7, the hinge cover 38 is generally a unitary, metal U-shaped structure and includes a cover portion 58 and a mounting tab 60. As shown in FIG. 7, the cover portion 58 is a generally U-shaped member with a first extension 62 (retention arm) a second extension 64 (retention arm) and a connecting wall 66 extending between the first and second extensions 62, 64. In other words, the hinge cover 38 includes two opposed retention arms. The first and second extensions 62, 64 extend from a proximal end 68 adjacent the connecting wall 66 to a distal end 70. The first and second extensions 62, 64 can be generally parallel or extend at any suitable angle relative to each other. For example, in one embodiment, the first and second extensions 62, 64 extend away from each other from the proximal ends 68 to the distal ends 70. The connecting wall 66 is generally rectangular, but can be any suitable shape, and has a generally circular fastener opening 72. The fastener opening 72 is preferably disposed along the center line of the cover portion 58 and is configured to align with the fastener aperture 56 of the hinge base 36.

The mounting tab 60 includes a base portion 74 extending downward from the connecting wall 66 and a retaining portion 76 with an engagement surface 76a extending downward and offset from the base portion 74. That is, as shown in FIG. 7, the mounting tab 60 extends downward from substantially the center of the connecting wall 66. An offset portion 78 extends rearwardly and about 90 degrees from the base portion 74 and the retaining portion 76 extends downwardly and about 90 degrees from the offset portion 78.

As shown in FIGS. 1-4, 8 and 9, the covering panel 20 is preferably metal and comprises a covering portion 80, a plurality of attachment brackets 82 and at least one hanging loop 84. The covering panel 20 is rectangular and is formed from a plurality of wires 20a that form a mesh grid pattern; however, it is noted that covering portion 80 can be formed in any suitable manner and in any suitable shape, so as to cover the window opening 14. The covering portion 80 has a top edge 80a, a bottom edge 80b and left and right side edges 80c, 80d.

The at least one hanging loop 84 in one embodiment is two hanging loops 84. The hanging loops 84 are attached or disposed at the top edge 80a of the covering portion 80. In this embodiment, the hanging loops 84 are welded to the covering portion 80 but can be attached in any suitable manner. The hanging loops 84 include upwardly extending sections 86 (connecting sections) and a hanging section 88 disposed between the upwardly extending sections 86. In this embodiment. The upwardly extending sections 86 are generally parallel and each extend substantially perpendicular to the hanging section 88. Preferably, the hanging loops 84 are attached to the covering portion 80 on the inboard side thereof.

As shown in FIG. 10, the upwardly extending sections 86 of the loop 84 portion have an angle α that enables the covering panel 20 to extend at an angle β to the plane of the window opening 14 when the covering panel 20 is not secured to the body structure 16 using the mounting studs 32. In one embodiment, the angle α in the upwardly extending sections 86 is an obtuse angle between about 135 degrees and less than 180 degrees.

The plurality of attachment brackets 82 is preferably about 8 attachment brackets 82 disposed or attached along the edges 80a-80d of the covering panel 20. In this embodiment, an attachment bracket 82 is disposed along the left edge 80c. The attachment bracket 82 disposed on the left edge 80c is disposed so as to be near or adjacent the top edge 80a. An attachment bracket 82 is disposed along the right edge 80d. The attachment bracket 82 disposed on the right edge 80d is disposed near or adjacent the bottom edge 80b. Three attachment brackets 82 are disposed along top edge 80a, with an attachment bracket 82 disposed adjacent the left edge 80c, an attachment bracket 82 disposed adjacent the right edge 80d and the attachment brackets 82 disposed between these two attachment brackets 82. Three attachment brackets 82 are disposed along the bottom edge 80b, with the attachment brackets 82 disposed adjacent the right edge 80d, and two attachment brackets 82 disposed generally in the center of the bottom edge 80b. The position and number of attachment brackets 82 illustrated herein is merely exemplary, and there can be any suitable number of attachment brackets 82 disposed in any desired position. Accordingly, as can be seen in FIG. 2, each of the attachment brackets 82 is arranged on the covering panel 20 so as to be aligned with a corresponding mounting stud 32.

Figure 9:
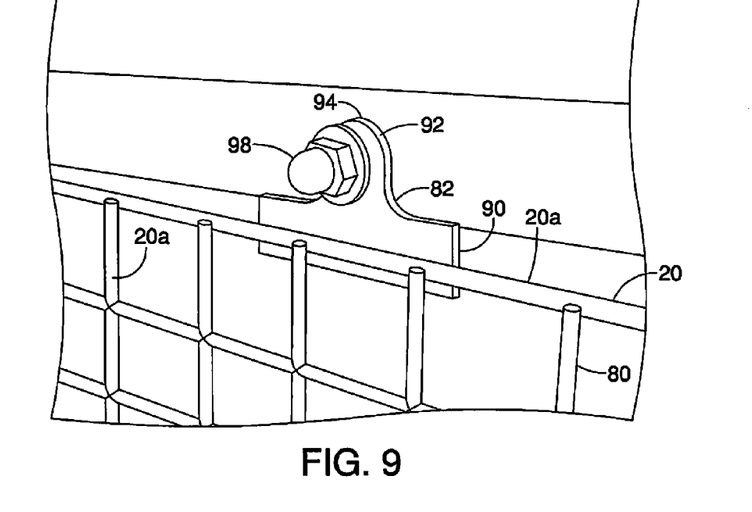
FIG. 9 illustrates an enlarged perspective view of an attachment bracket in the vehicle window assembly shown in FIG. 2.

On one embodiment, as shown in FIGS. 8 and 9, each attachment bracket 82 includes a mounting portion 90 and an attaching portion 92. The mounting portion 90 is generally rectangular and can be welded to the covering panel 20. In this embodiment, the mounting portion 90 can be attached to the wire 20a at the edges 80a-d of the covering panel 20. Since the wires 20a are circular, the mounting brackets 82 can be rotated around the longitudinal axis of the wire so as to properly align the attachment portion 92 with the body structure 16. This configuration enables the covering panel 20 to be applied to multiple window openings have differing structures. The attaching portion 92 is preferably unitary with the mounting portion 90 and extends therefrom. The attaching portion 92 can have a rounded tab portion 94 with an attachment opening 96 extending therethrough. The attachment opening 96 is configured to receive the threaded shaft 34 from the mounting stud 32. It is noted that the attachment brackets 82 can have any suitable structure and configuration and the structure disclosed herein is merely exemplary.

Figure 17:
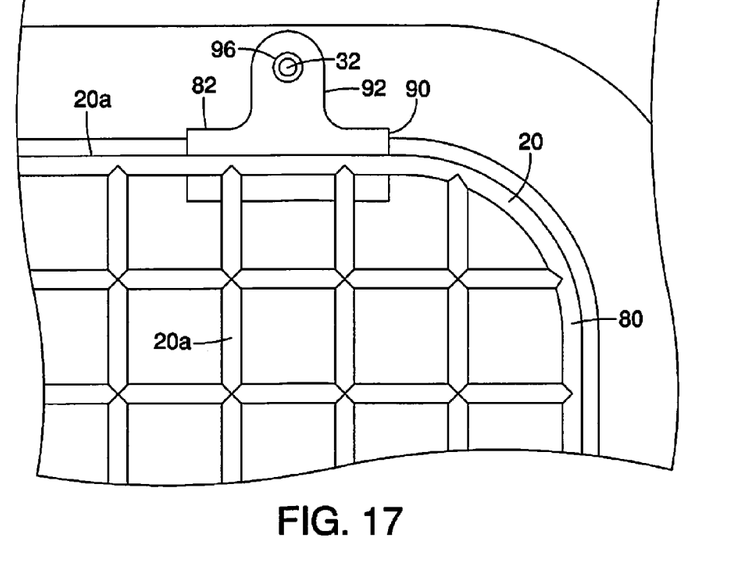
FIG. 17 is a front elevational view of a attachment bracket of the covering panel disposed adjacent a mounting stud of the body structure when the covering panel of FIG. 2 is in an unsecured state.
Figure 18:
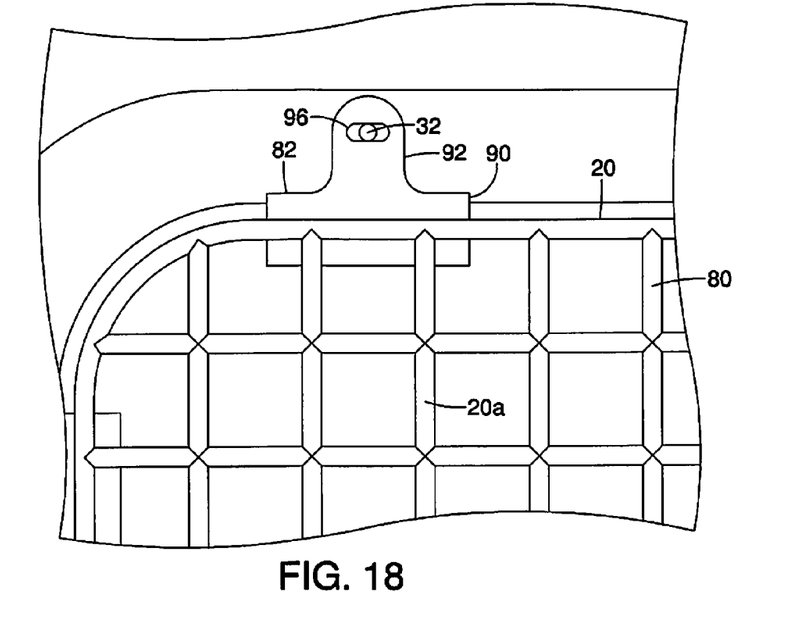
FIG. 18 is a front elevational view of another bracket of the covering panel disposed adjacent a mounting stud of the body structure when the covering panel of FIG. 2 is in an unsecured state.

The attachment brackets 82 can have an attachment opening 96 of any suitable size. For example, the attachment opening 96 can be a two way (FIG. 18) or a four way opening (FIG. 17) to facilitate alignment of the covering panel and insertion of all of the mounting studs 32 into all of the corresponding attachment brackets 82.

Figure 11:
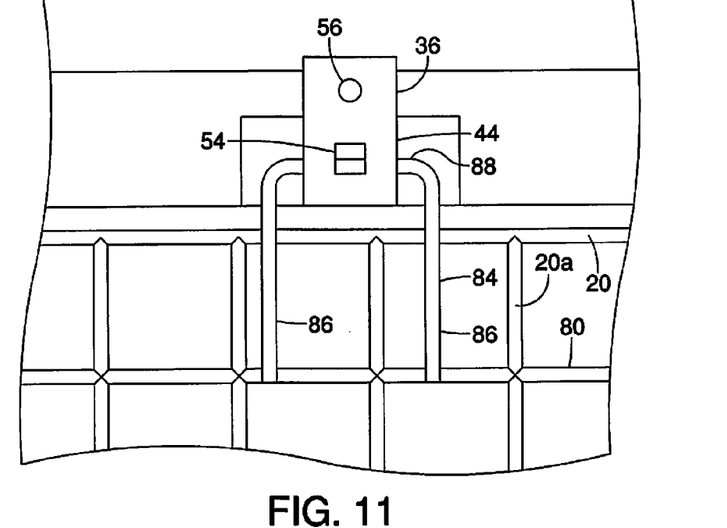
FIG. 11 is a front elevational view of the hinge base of the hinge structure shown in FIG. 3 with a hanging loop of the covering panel disposed on the hinge base.
Figure 12:
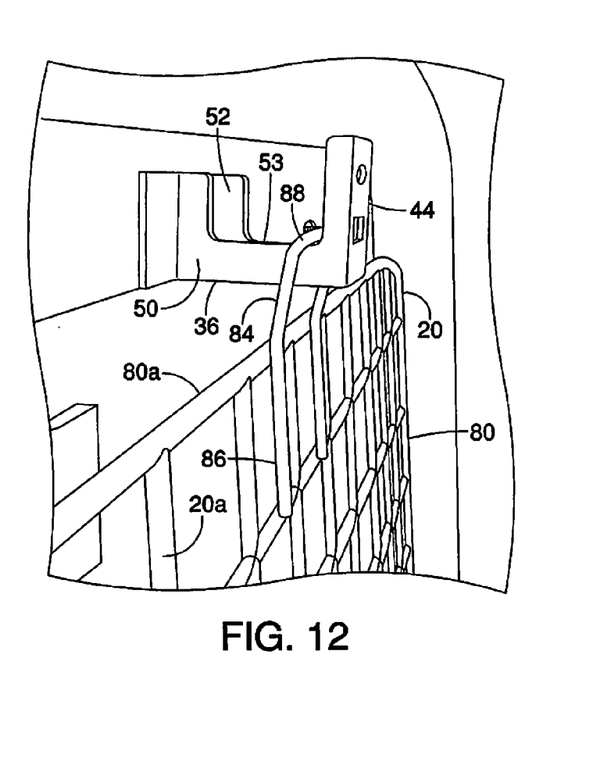
FIG. 12 is a side view of the hinge base and the hanging loop shown in FIG. 11.
Figure 13:
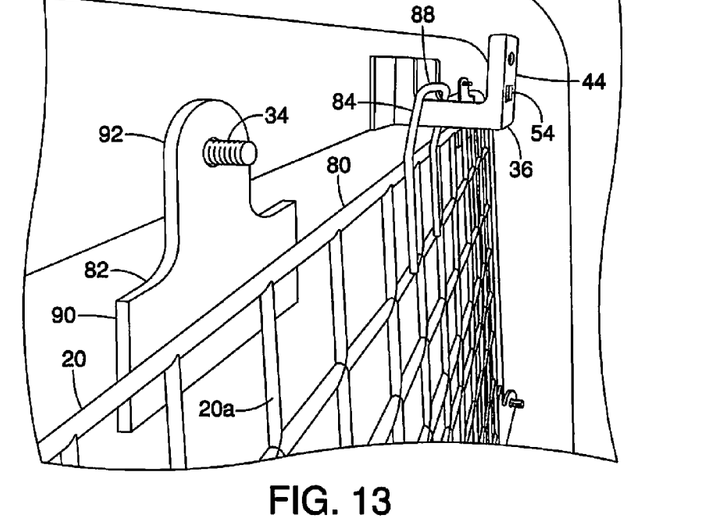
FIG. 13 is a side view of the attachment bracket disposed on the mounting stud.
Figure 14:
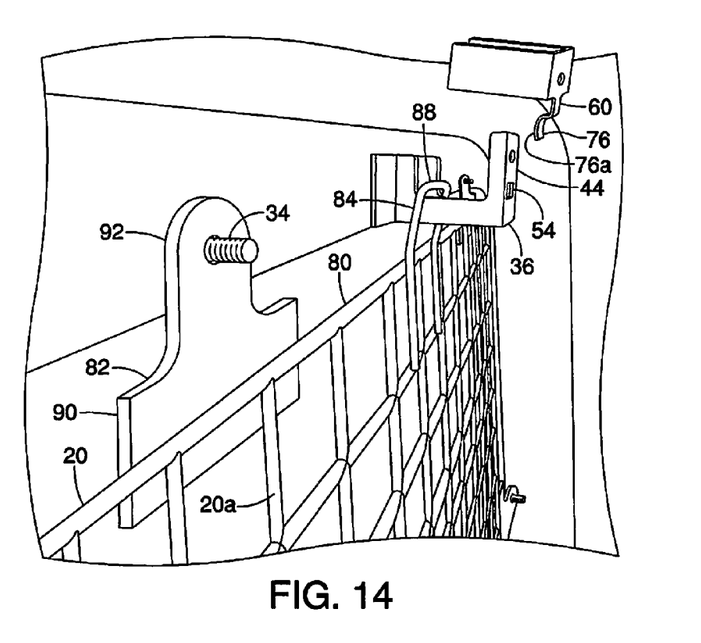
FIG. 14 is a side view of the hinge base, the hinge cover and the covering panel prior to installation of the hinge cover.
Figure 15:
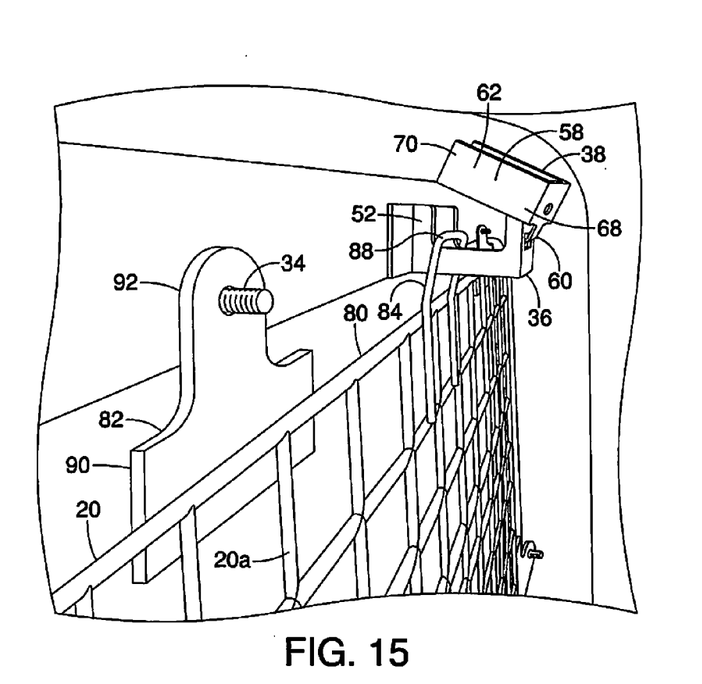
FIG. 15 is a side view of the hinge base, the hinge cover and the covering panel shown in FIG. 14 with the hinge cover being installed onto the hinge base.

Turning to FIGS. 11 and 12, to assemble the vehicle window assembly 12, the hanging loop 84 is disposed or hung onto the loop support portion 46 of the hinge base 36. In other words, the hanging section 88 of the hanging loop 84 is supported by the loop support section 46 when in the covering panel 20 is in the unsecured position. The hanging loop 84 is capable of moving or sliding along the loop support portion 46. The hinge cover 38 can then be positioned onto the hinge base 36. As shown in FIGS. 13-15, the mounting tab 60 of the hinge cover 38 is inserted into the tab aperture 54 of the hinge base 36, and rotated into position. As can be understood, the hinge cover 38 has a center of gravity outboard of a midpoint of the hinge cover 38, the center of gravity causing the engagement surface 76a of the mounting tab 60 to be biased into engagement with the outboard surface 44b of the wall 44a. Such an engagement maintains the hinge cover 38 is the proper position relative to the hinge base 36.

Figure 16:
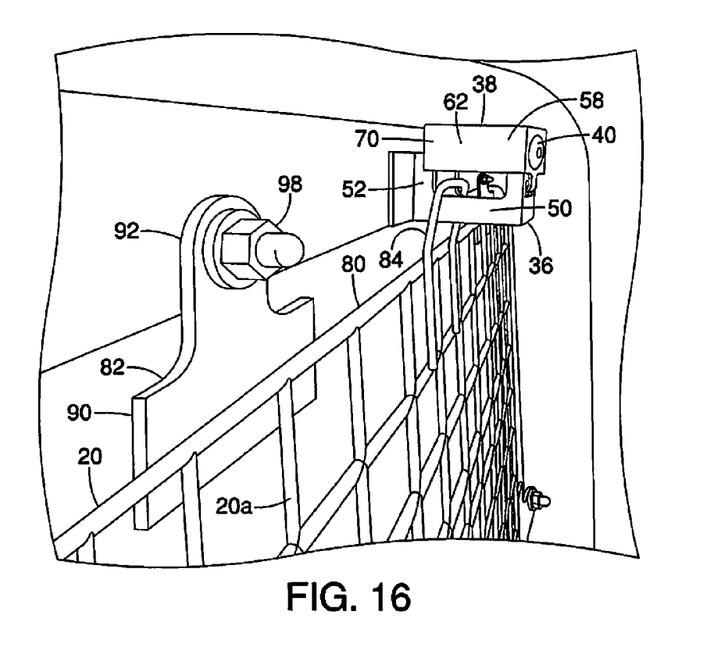
FIG. 16 is a side view of the hinge base, the hinge cover and the covering panel shown in FIG. 15 with the a fastener fastening the hinge cover to the hinge base.

As shown in FIG. 16, the hinge cover 38 and hinge base 36 form a space or area therebetween that allows the hanging loop 84 to move both laterally (i.e., in an inboard and outboard direction of the vehicle) and in an up and down (vertical) direction. Moreover, the hanging section 88 of the hanging loop 84 is spaced apart from the loop support portion 46 of the hinge base 36 and the retention flanges of a respective hinge structure 18 when the covering panel 20 is in the secured position with the studs 32 received by the attachment openings 96 of the attachment brackets 82 and supporting the covering panel 20.

Once the hinge cover 38 is positioned relative to the hinge base 36, a fastener 40 is inserted into the fastener opening 72 of the hinge cover 38 and through the fastener aperture 56 of the hinge base 36. The fastener 40 is preferably a non-removable fastener such as a rivet or any other suitable removable or non-removable fastener.

Preferably in this configuration, with the hanging loops 84 installed to the hinge base 36 and covered by the hinge cover 38, the attachment brackets 82 are aligned so as to contact the ends of the threaded shafts 34 of the mounting studs 32. That is, each of the attachment brackets 82 are aligned so as to contact the threaded shafts 34 to prevent the covering panel 20 from approaching the window opening 14. The attachment brackets 82 are further configured and aligned so that if the hanging loops 84 are in the unsecured positions and the attachment brackets 82 are unaligned with the mounting studs 32, at least the attaching portions 92 will contact the body structure 16 so as to prevent the covering panel 20 from approaching the window opening 14 or passing through the window opening 14.

Moreover, in this configuration (i.e. the unsecured position), as shown in FIG. 10, the hanging section 88 of the hanging loop 84 is disposed adjacent the cover mounting portion 44 of the hinge base 36. In other words, in the unsecured position, the hanging section 88 of the hanging loop 84 is disposed adjacent the cover mounting portion 44 of the hinge base 36 and the attachment brackets 82 are unattached to the mounting studs 32. In this position, the covering panel 20 extends at a predetermined angle such that the covering panel 20 extends downward from the hinge structure 18 and remains outboard of an inboard-most surface of the body structure 16, and does not contact the outer surface 100 or edge of the vehicle 10 when the body structure 16 (i.e., the door) is moved into an open position. That is, the covering panel 20, when in the unsecured position, extends downward from the hinge structure 18 so as to form a first outboard angle between the plane of the window opening 14 and a plane of the covering panel 20.

Figure 19:
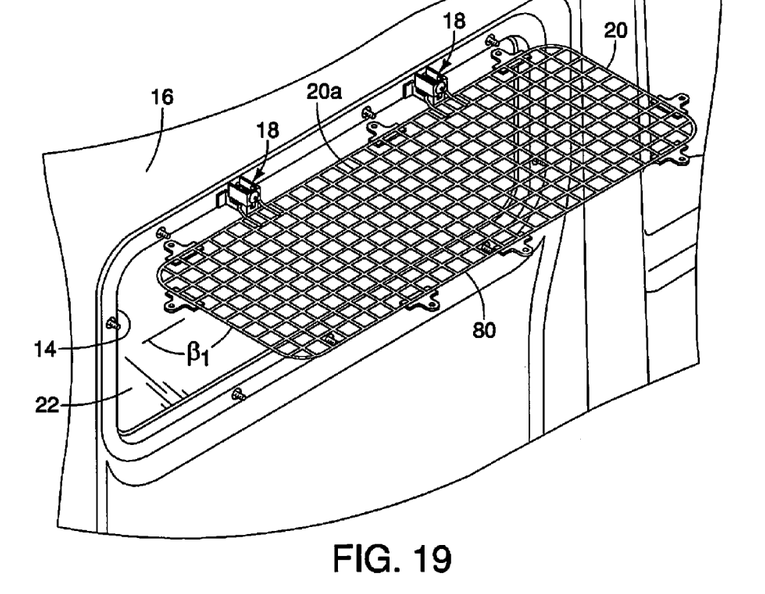
FIG. 19 is a side perspective view of the covering panel of FIG. 2 shown in an unsecured position and rotated to a window access position.
Figure 20:
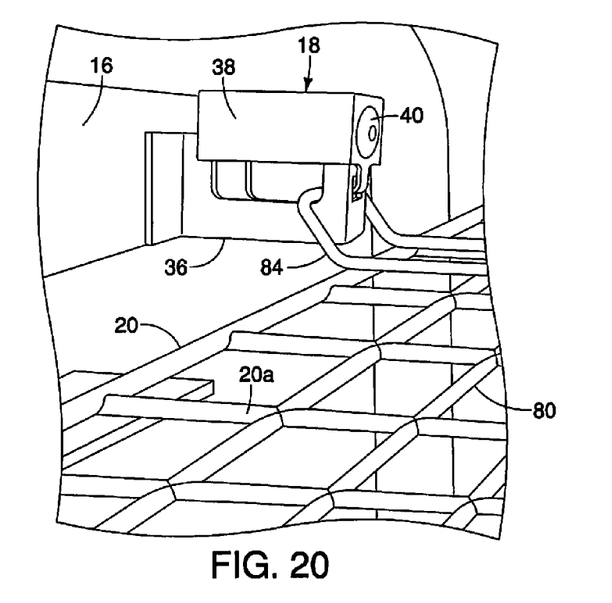
FIG. 20 is an enlarged side view of the hinge structure with the hanging loop in the unsecured position and the covering panel rotated to the window access position.

Further, the unsecured position enables the covering panel 20 to be moveable between a first position in which the covering extends at a first angle β to the plane of the window opening 14, and a second position in which the covering extends at a second angle $β_1$ to the plane of the window opening 14, the second angle $β_1$ being larger than the first angle β. See for example, FIGS. 19 and 20. This position enables the widow 22 and other areas of the body structure 16 to be cleaned. With the hinge cover 38 installed and fixed to the hinge base 36, trapping the hanging loop 84 therebetween, the covering panel 20 may be rotated to a window access position, but the covering panel 20 cannot be removed and will continue to protect the window opening 14 even if left unsecured (unattached to the mounting studs 32).

As shown in FIGS. 13 and 16-18, to secure the covering panel 20 to the body structure 16, the attachment brackets 82 are aligned with the mounting studs 32. The threaded shafts 34 of the mounting studs 32 are inserted into the attachment openings 96 of the attachment brackets 82 and a nut 98 (FIG. 16) is threaded onto the threaded shaft 34. Accordingly, the nut 98 being is disposed on the mounting stud 32 to sandwich the attaching portion 92 (attachment flange) between the body structure 16 and the nut 98, so as to retain the covering panel 20 in the secured position. In the secured position, the hanging section 88 of the hanging loop 84 is positioned adjacent the attachment portion 42 of the hinge base 36. In other words, in the secured position, the hanging section 88 of the hanging loop 84 is positioned adjacent the attachment portion 42 of the hinge base 36 and the attachment brackets 82 are installed on the mounting studs 32 and the covering panel 20 extends parallel to a plane of the window opening 14.

As can be understood, by removing the nuts 98, the covering panel 20 is movable between a secured position in which the hanging section 88 of the hanging loop 84 is positioned adjacent the attachment portion 42 of the hinge base 36 and the attachment brackets 82 are installed on the mounting studs 32 and the covering panel 20 extends parallel to a plane of the window opening 14, and an unsecured position in which the hanging section 88 of the hanging loop 84 is disposed adjacent the cover mounting portion 44 of the hinge base 36 and the attachment brackets 82 are unattached to the mounting studs 32, enabling the covering panel 20 to be moveable between a first position in which the covering extends at a first angle to the plane of the window opening 14, and a second position in which the covering extends at a second angle to the plane of the window opening 14, the second angle being larger than the first angle.

Second Embodiment

Figure 21:
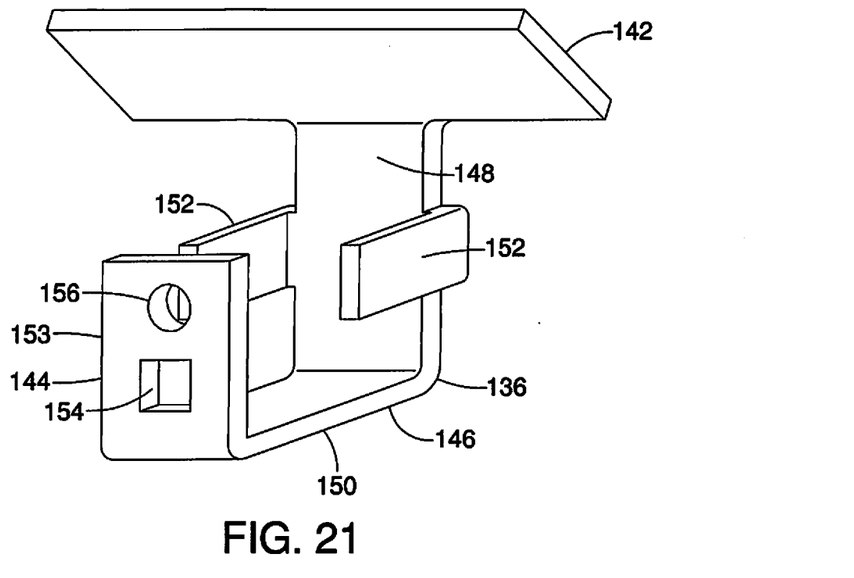
FIG. 21 illustrates another embodiment of the hinge base.
Figure 22:
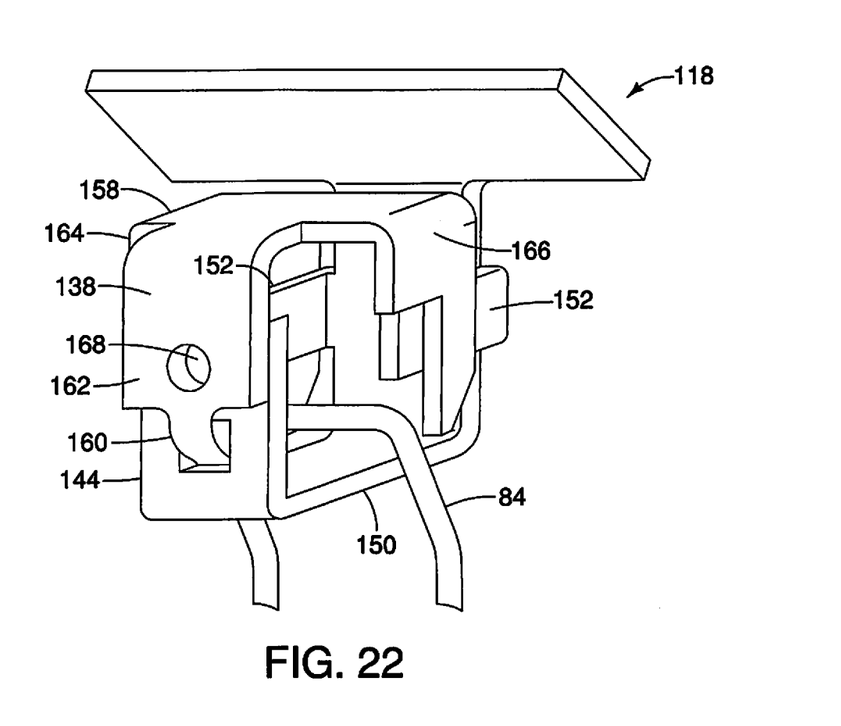
FIG. 22 illustrates the hinge base shown in FIG. 21 with another embodiment of a hinge cover.

Referring now to FIGS. 21 and 22 in accordance with a second embodiment of the hinge structure 118 will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIGS. 21 and 22 illustrate a hinge structure 118 according to the second embodiment. As shown in FIG. 21, the hinge base 136 includes an attachment portion 142, a cover mounting portion 144, and a loop support portion 146.

In one embodiment, the attachment portion 142 is a generally rectangular flange that is proximal to and rigidly attached to the upper portion 24 of the body structure 16. In this embodiment the attachment portion 142 extends generally inwardly into the vehicle 10, as to facilitate attachment of the hinge base 136 to the upper portion 24 of the body structure 16. The attachment portion 142 can be any suitable configuration, and can' be attached to the upper portion 24 of the body structure 16 in any suitable manner, such as welding or adhesive.

The hinge base 136 generally includes an upright portion 148 attached to and extending between the attachment portion 142 and the loop support portion 146. The upright portion 148 includes opposed retention flanges 152 extending therefrom. The retention flanges 152 generally extend inboard at a 90 degree angle from the upright portion 148. The loop support portion 146 includes a flat section 150 extending inboard from the upright portion 148 in a generally perpendicular manner, or at any suitable angle. In this embodiment, the flat section 150 extends from the upright portion 148 at an angle of more than 90 degrees.

The cover mounting portion 144 is attached to the loop support portion 146 such that the cover mounting portion 144 extends upwardly from the loop support portion 146. The cover mounting portion 144 extends generally upwardly and perpendicularly from the loop support portion 146. The cover mounting portion 144 includes a generally rectangular wall 153 that extends between, and includes a tab aperture 154 and a fastener aperture 156. In this embodiment, the fastener aperture 156 and the tab aperture 154 are both disposed approximately along the center line of the cover mounting portion 144 with the fastener aperture 156 being disposed above the tab aperture 154. The tab aperture 154 is generally rectangular and the fastener aperture 156 is generally circular. However, each aperture can be any suitable shape or configuration.

As shown in FIG. 22, the hinge cover 138 is generally a unitary, metal structure and includes a cover portion 158 and a mounting tab 160. The cover portion 158 includes a mounting wall 162, a first extension 164 (retention flange), and a second extension 166 (retention flange). In other words, the hinge cover 138 includes two opposed retention arms. The first and second extensions 164, 166 can be generally parallel or extend at any suitable angle relative to each other. For example, in one embodiment, the first and second extensions 164, 166 extend away from each other from the proximal ends to the distal ends. The mounting wall 162 is generally rectangular, but can be any suitable shape, and has a generally circular fastener opening 168. The fastener opening 168 is preferably disposed along the center line of the cover portion 158 and is configured to align with the fastener aperture 156 of the hinge base 136.

Similarly to the embodiment discussed above, the mounting tab 160 of the hinge cover 138 is inserted into the tab aperture 154 of the hinge base 136, and rotated into position. As can be understood, the hinge cover 138 has a center of gravity outboard of a midpoint of the hinge cover 138, the center of gravity causing the engagement surface of the mounting tab 160 to be biased into engagement with the outboard surface of the cover mounting portion 144. Such an engagement maintains the hinge cover 138 is the proper position relative to the hinge base 136.

The hinge cover 138 and hinge base 136 form a space or area therebetween that allows the hanging loop 84 to move both laterally (i.e., in an inboard and outboard direction of the vehicle) and in an up and down (vertical) direction. Moreover, the hanging section 88 of the hanging loop 84 is spaced apart from the loop support portion 146 of the hinge base 136 and the first and second extensions 164, 166 of the hinge cover 138 of a respective hinge structure 118 when the covering panel 20 is in the secured position.

Once the hinge cover 138 is positioned relative to the hinge base 136, a fastener 40 is inserted into the fastener opening 168 of the hinge cover 138 and through the fastener aperture 156 of the hinge base 136. The fastener 40 is preferably a non-removable fastener such as a rivet or any other suitable removable or non-removable fastener.

Third Embodiment

In this embodiment, the steel wire and attachment brackets of the covering panel 20 are replaced with a polycarbonate sheet. The attachment brackets and hanging loops can be attached to the polycarbonate sheet by fasteners, for example. The attachment brackets and hanging loops can extend outwardly or inwardly from the periphery of the polycarbonate sheet. In this embodiment the polycarbonate sheet can be 3 to 4 mm in thickness with the attachment brackets being about 1.6 mm thick.

The vehicle body structure 16 is a conventional component that is well known in the art. Since vehicle body structure 16 is well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", and "vertical", as well as any other similar directional terms refer to those directions of a vehicle equipped with the vehicle window assembly. Accordingly, these terms, as utilized to describe the present invention should be interpreted relative to a vehicle equipped with the vehicle window assembly.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle window assembly comprising:
a body structure defining a window opening, and having an upper portion extending along an upper edge of the window opening;
a hinge structure comprising a hinge base and a hinge cover, the hinge base comprising an attachment portion attached to the upper portion of the body structure, a cover mounting portion, and a loop support portion extending from the attachment portion to the cover mounting portion, the hinge cover being attached to the cover mounting portion; and
a covering panel overlaying an inboard side of the window opening, and comprising a hanging loop with a hanging section being disposed between the loop support portion of the hinge base and the hinge cover, and being movable between a secured position in which the hanging section of the hanging loop is positioned adjacent the attachment portion of the hinge base, and an unsecured position in which the hanging section of the hanging loop is disposed adjacent the cover mounting portion of the hinge base.

2. The vehicle window assembly according to claim 1, wherein
the attachment structure is a flange rigidly attached to the upper portion of the body structure.

3. The vehicle window assembly according to claim 1, wherein
the hinge base includes a pair of opposed retention flanges extending from the attachment portion, and the hinge cover includes opposed retention arms, the opposed retention arms overlapping the opposed retention flanges.

4. The vehicle window assembly according to claim 3, wherein
the hanging loop is one of a pair of hanging loops disposed along an upper edge of the covering panel, and the hinge structure is one of a pair of hinge structures, each of the hanging loops including connecting sections fixedly attached to the upper edge of the covering panel, the hanging section being disposed between the connecting sections, and the hanging section being spaced apart from the loop support portion of the hinge base and the retention flanges of a respective hinge structure when the covering panel is in the secured position.

5. The vehicle window assembly according to claim 1, wherein
the cover mounting portion defines a tab aperture, and the hinge cover includes a mounting plate with a mounting tab, the mounting tab including a base portion extending downward from the mounting plate and a retaining portion extending downward and offset from the base portion, the retaining portion extending through the tab aperture.

6. The vehicle window assembly according to claim 5, wherein
the retaining portion includes an engagement surface that contacts an outboard surface of the cover mounting portion.

7. The vehicle window assembly according to claim 6, wherein
the hinge cover has a center of gravity outboard of a midpoint of the hinge cover, the center of gravity causing the engagement surface to be biased into engagement with the outboard surface.

8. The vehicle window assembly according to claim 1, wherein
the cover mounting portion defining a first fastener aperture, and the hinge cover includes a mounting plate with a second fastener aperture, and a fastener extends through the first fastener aperture and the second fastener aperture of the hinge cover so as to attach the hinge cover to the hinge base.

9. The vehicle window assembly according to claim 1, wherein
the covering panel, when in the unsecured position, extends downward from the hinge structure so as to form a first outboard angle between the plane of the window opening and a plane overlaying the covering panel.

10. The vehicle window assembly according to claim 9, wherein
the covering panel, when in the unsecured position, extends downward from the hinge structure such that the covering panel remains outboard of an inboard-most surface of the body structure.

11. The vehicle window assembly according to claim 10, wherein
the body structure is a sliding door movable from a closed position in which the sliding door is positioned between a forward pillar and a rearward pillar, and an open position in which the sliding door is positioned outboard of the rearward pillar, and the covering panel, when in the unsecured position, extends downward such that the covering panel is positioned outboard of and free from contacting the rearward pillar when the sliding door is moved to the open position.

12. The vehicle window assembly according to claim 9, wherein
the covering panel is configured, when in the unsecured position, to be rotated about the hinge structure to extend at a second outboard angle larger than the first outboard angle so as to expose the window opening.

13. The vehicle window assembly according to claim 1, further comprising
a plurality of attachment brackets disposed at locations on a periphery of the covering panel, the locations of the attachment brackets corresponding to mounting studs on the body structure.

14. The vehicle window assembly according to claim 13, wherein
each attachment of the plurality of attachment brackets includes a base portion attached to the covering panel, and an attachment flange extending from the base portion and defining a fastener aperture receiving the mounting stud, and a nut being disposed on the mounting stud to sandwich the attachment flange between the body structure and the nut, so as to retain the covering panel in the secured position.

15. The vehicle window assembly according to claim 14, wherein
the covering panel is configured such that, when in the unsecured position, the mounting studs are removed from each of the fastener apertures, and at least a portion of each of the attachment flanges overlies the body structure.

16. The vehicle window assembly according to claim 1, wherein
the covering panel includes a plurality of wires forming a mesh.

17. The vehicle window assembly according to claim 1, wherein the hanging section of the hanging loop is spaced apart from the loop support section when the covering panel is in the secured position, and supported by the loop support section when in the covering panel is in the unsecured position.

18. A hinge structure comprising:

a hinge base comprising an attachment portion configured to be attached to vehicle structure, a cover mounting portion, and a loop support portion extending from the attachment portion to the cover mounting portion; and a hinge cover configured to be attached to the cover mounting portion, the hinge base and hinge cover being configured such that, when coupled together, a hanging section of a hanging loop is disposed between the loop support portion of the hinge base and the hinge cover, and is movable between a secured position in which the hanging section is positioned adjacent the attachment portion of the hinge base, and an unsecured position in which the hanging section of the hanging loop is disposed adjacent the cover mounting portion of the hinge base.

19. A vehicle window assembly comprising:

a body structure defining a window opening, and having an upper portion extending along an upper edge of the window opening and a plurality of mounting studs;

a hinge structure comprising a hinge base and a hinge cover, the hinge base comprising an attachment portion attached to the upper portion of the body structure, a cover mounting portion, and a loop support portion extending from the attachment portion to the cover mounting portion, the hinge cover being attached to the cover mounting portion;

a covering panel overlaying an inboard side of the window opening, and comprising a plurality of attachment brackets and a hanging loop with a hanging section being disposed between the loop support portion of the hinge base and the hinge cover, and being movable between a secured position in which the hanging section of the hanging loop is positioned adjacent the attachment portion of the hinge base, the attachment brackets are installed on the mounting studs, and the covering panel extends parallel to a plane of the window opening, and an unsecured position in which the hanging section of the hanging loop is disposed adjacent the cover mounting portion of the hinge base and the attachment brackets are unattached to the mounting studs, enabling the covering panel to be moveable between a first position in which the covering extends at a first angle to the plane of the window opening, and a second position in which the covering extends at a second angle to the plane of the window opening, the second angle being larger than the first angle.

20. The vehicle window assembly according to claim 19, wherein the hanging section of the hanging loop is spaced apart from the loop support section when the covering panel is in the secured position, and supported by the loop support section when in the covering panel is in the unsecured position.

* * * * *